Patented Feb. 16, 1943

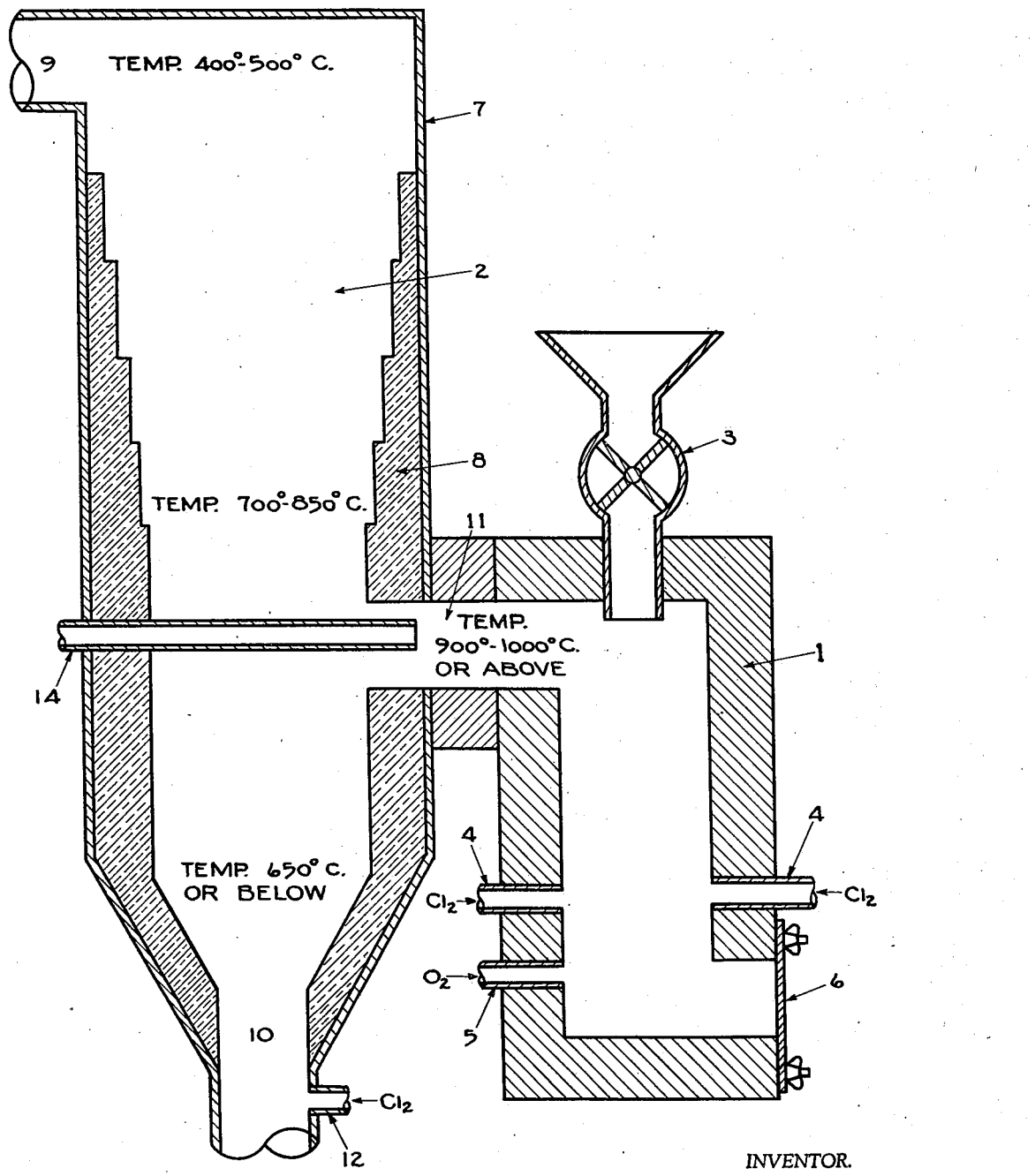

2,311,459

UNITED STATES PATENT OFFICE 2,311,459

CHLORINATION OF CHROMIUM BEARING MATERIALS

Irving E. Muskat, Akron, Ohio, assignor to Pittsburgh Plate Glass Company, Pittsburgh, Pa., a corporation of Pennsylvania Application October 13, 1941, Serial No. 414,754

4 Claims. (Cl. 75—112)

This invention relates to the chlorination of chromium bearing materials such as chromite ore or other chromium oxide bearing ore and to the recovery of chlorides of chromium thereby. In a prior United States Letters Patent No. 2,185,218, granted to myself and Norman Howard, methods of chlorinating such materials have been described and claimed whereby a vaporized mixture of iron and chromium chlorides is formed. In order to recover the chlorides of chromium therefrom, the vapors are cooled to a temperature below about 800° C.

The condensed chloride thus obtained is often of poor color and appearance and is in the form of very finely divided crystals. Furthermore, when iron chloride or similar halide is present, methods involving fractional condensation of iron and chromium chlorides are resorted to, the chromium chloride being obtained is often impure and contains a substantial quantity of iron. In addition, it is often difficult to cool the vapors with sufficient rapidity to produce relatively large crystals.

In accordance with the present invention I have found that the condensation of chromium chloride maye be substantially assisted by adding a quantity of an inert gas which is unreactive to chromium chloride at the operating temperature, such as nitrogen, carbon monoxide, carbon dioxide, carbon tetrachloride, titanium or silicon tetrachloride, or similar agent which is substantially inert to chromium chloride and which is gaseous at the temperature of operation, to the chromium chloride vapor prior to or during condensation of the chloride. I have found that if chromium chloride is fractionally condensed from iron chloride by such a process a product is secured of substantially higher purity than that prepared by ordinary methods. Moreover, the introduction of inert or nonreactive gas which does not decompose the chloride in the vapor materially improves the efficiency of the condensation and assists the cooling of the halide vapors to a temperature sufficiently low to permit condensation of the halide therefrom.

The gas is preferably introduced at a low temperature whereby a more effective cooling of the chromic chloride is secured and relatively large chromic chloride crystals of uniform size and color are formed. The gas may be introduced into the chromium chloride vapors prior to introduction of the vapors into the condenser or it may be introduced directly into the condenser, or it may be generated within the chromium chloride vapors by introducing other substances which are normally fluid such as liquids capable of vaporizing at the condensing temperature of the chloride being condensed. For example, liquid carbon tetrachloride, titanium tetrachloride, etc., may be introduced into the vapors in accordance with my invention. Normally solid chlorides or other solid agent capable of subliming to form a gaseous agent such as sulphur, chromic chloride, etc. may also be used although in such cases the resulting product may not be obtained in a form as pure as when a normally gaseous or liquid material is used. Where high purity is desirable, the solid agent introduced should be one other than iron chloride or other agent which tends to contaminate the condensing halide during normal condensation operation. On the other hand, such agents as iron chloride may be introduced where high purity of the product is not essential. Thus, the process of mixing a nonreactive gas with the hot vapors is intended to include a process wherein solids or liquids capable of being vaporized are mixed in lieu or in addition to inert gas. Preferably, agents which are gaseous at temperatures of 200° C. or below are utilized.

The invention is particularly directed to the condensation of chromium chloride from vapors such as are obtained by chlorination of chromium ores or other chromium bearing material at a temperature above 850° C., such as the vapors produced in accordance with the process of the above-mentioned Letters Patent, or the processes described in my United States Letters Patent Nos. 2,240,435 and 2,242,257. Such vapors normally contain iron chloride, chromium chloride, and magnesium chloride, carbon monoxide, carbon dioxide, nitrogen, and more or less chlorine. However, it may be applied to the treatment of other vapors containing chromic and/or chromous chloride or other chromium chloride such as those obtained by subliming chromic chloride for purification purposes.

The process is generally conducted in a manner such as to secure fractional condensation of chromic chloride from a vaporized mixture of chromium chlorides and iron chlorides. In such a case the temperature is maintained above about 350° C. and below about 850° C. In some cases, however, more or less iron chloride may be condensed with the chromium chloride and where this is deemed advisable, substantially lower temperatures of condensation, for example, 100° C., or below, may be used. If desired, the condensation may be conducted in a series of stages wherein a portion of the chromium chloride may be separately condensed in a highly purified form and thereafter iron and chromium chlorides are simultaneously condensed in a further operation. If magnesium chloride is present, this chloride generally condenses with the chromic chloride and may be recovered by extraction with water.

The invention is particularly applicable for use in treatment of vapors produced by reaction of a chromium bearing material with an amount of chlorine not appreciably in excess of the theoretical for formation of CrCl₃. Such vapors generally comprise a mixture of chromic and chromous chlorides and may be prepared by the process described in my application for Letters Patent, Serial No. 378,084, filed February 8, 1941.

Upon condensation of the chromium chloride and iron chloride the uncondensed gases which comprise nitrogen and oxides of carbon may be used as the nonreactive gas and may be introduced into the chromic chloride vapors after they are removed from the reaction zone to assist condensation of a further quantity of chromic chloride.

The amount of gas required is dependent upon the temperature of the vaporized chromic chloride. However, in condensing chlorides from gases having a temperature of 900 to 1100° C., or above, it is found desirable to utilize one-half to two parts by volume of diluent gas per part of vapor undergoing condensation. In order to secure chromic chloride in a uniform size and in highly purified form, the chloride is preferably condensed at a temperature of 550 to 750° C.

The present process permits condensation of chromium chloride in gas suspension and out of substantial contact with the walls of the condenser, whereby the necessity of scrapers and other moving parts within the condenser is eliminated.

The invention will be more fully understood by reference to the accompanying drawing which is a diagrammatic sectional view of an apparatus capable of use in accordance with the present invention. As therein illustrated, the apparatus comprises a chlorination shaft furnace 1, connected to a condenser 2. The furnace is provided with a hopper and feed 3, for feeding the ore into the furnace, chlorine tuyères 4, air or oxygen tuyères 5, and a suitable outlet for unchlorinated residue. The condenser comprises a cylindrical shell 7, lined with heat insulation 8. In order to permit the establishment of zones of different temperature throughout the column, the thickness of the insulation is varied, tapering as illustrated, toward the upper portion of the tower so that the uppermost portion thereof may be substantially uninsulated. In like manner, the thickness of the insulation at the base of the condenser may be less than that at the central portion thereof. The condenser is provided with an inlet 11, for introduction of the halide vapors to be condensed, outlet 10, for removing condensed chloride and an outlet 9, for removal of gases. Often the condenser inlet is located as to introduce the halide vapors tangentially in order to cause the gases to whirl within the condenser. The condenser is also provided with an inlet tube 14, for introduction of chlorine. This inlet tube may extend into the condenser inlet 11, or may be placed in any other convenient location to permt dilution of the vapors by chlorine.

Inert gas is introduced through tube 14 into the inlet 11 where it mixes with the incoming vapors. This gas materially assists the condensation of the chromium chloride in a highly pure state, and is particularly effective in assisting separation of this chloride or other chlorides from vaporized iron chloride.

The temperature below inlet 11 is maintained above 400° C., preferably about 550 to 750° C. in order to minimize or prevent formation or accumulation of solid iron chloride within this zone.

The chromium chloride crystals thus formed fall through the condenser to the base thereof and are removed through outlet 10. In many cases it is desired to heat the solid chromium chloride in an atmosphere of chlorine or other halogen to increase the purity and crystal size in accordance with the method described in an application for Letters Patent Serial No. 404,230, filed July 26, 1941, by Alphonse Pechukas. In such case chlorine or halogen may be introduced through inlet 12, whereby the settling chloride is bathed with the incoming chlorine.

In order to maintain the process in continuous operation, it is preferred to introduce the ore, chlorine, and carbon and oxygen, if necessary, into the furnace reactor at a rate sufficient to maintain the temperature of reactor at least 900° C. and preferably above 1250° C. Ordinarily, this may be done by regulating the rate of introduction of chlorine and carbon-ore mixtures, preferably in the form of briquettes in accordance with periodic or continuous observation of the temperature of the reactors, as described in Patents 2,185,218 and 2,242,257. Thus, if the temperature within the reactor begins to increase to an undesirable degree, the rate of introduction of ore, chlorine, carbon and air may be decreased, while if the temperature is too low, these rates may be increased. The temperatures may also be controlled by regulating the rate of withdrawal of the chlorinated residue since a large amount of heat may be dissipated by rapid removal of the residue and the reactor cooled by cool incoming ore. Moreover, the temperature may be controlled by control of the amount of carbon and air or oxygen which is introduced. For a given carbon concentration an increase in the rate of chlorine introduction tends to increase the rate of reaction and consequently, the temperature of operation.

If difficulty is encountered in maintaining the temperature, lumps of carbonaceous material such as coke may be introduced with or without briquettes or ore and the rate of oxygen introduced increased to burn the coke. If the reaction becomes excessively hot, it may be cooled by introduction of carbon dioxide.

Since the temperature of the reaction may be regulated with comparative ease, at a temperature as high as about 850° C. and particularly above 1250° C., the rate of chlorination is capable of wide variation. In consequence, it is possible to control the temperature within the condenser over a wide range by variation of the rate of chlorination while maintaining the temperature of chlorination at the required value without externally heating the reactor or the condenser. This is particularly advantageous since the necessity of heating a portion of the condenser is eliminated, and thus, it is possible to construct the condenser essentially of heat insulating material. Thus, if the temperature at the top of the tower becomes too low, the temperature and/or rate of chlorination may be increased. Likewise, if the temperature within the condenser becomes too high, the temperature and/or rate of chlorination may be decreased. Temperatures at the various portions of the condenser or furnace may be determined by usual thermocouples inserted in suitably located thermocouple walls.

The carbon concentration in the ore-carbon mixture may be varied in accordance with the amount of oxygen and chlorine introduced into the furnace. The amount of oxygen or air required varies to some extent in accordance with the carbon concentration since with increased carbon concentrations some increase in air or oxygen is required. Generally, from one-half to three volumes of air per volume of chlorine is used.

Temperature within the condenser for any given throughput is also dependent upon the size of the condenser. Thus, an increase in the height and/or diameter of a condenser permits establishment of a lower temperature. At all events, the condenser should be sufficiently large to permit the major portion of the condensation to occur out of contact with the furnace walls, whereby most of the chromic chloride is condensed before the gases containing the chloride contact to any substantial degree, condenser walls which are cooled to a temperature capable of condensing chromic chloride. In usual operation, condensers having a cross-sectional area of at least about 3 square feet are utilized. In addition, the temperature within the condenser may be controlled by control of the thickness of the insulation. Thus, a variation in temperature from the point of entry to the top of the tower is insured by varying the thickness of insulation throughout the tower.

Uncondensed halides and exhaust gases cooled to 400–500° C. or below are withdrawn through outlet 9. Thereafter, these gases may be treated to condense iron chloride or other halide. Processes similar to that herein described may be utilized for this purpose by use of similar condensers and maintenance of lower temperatures.

The following examples are illustrative:

Example I

Briquettes were prepared containing 80 parts by weight of chromite ore and 20 parts by weight of carbon and were charged into a shaft furnace and chlorinated at a temperature of 1100° C. in accordance with the method described in U. S. Patent No. 2,185,218, whereby a vaporized mixture of chromium and iron chlorides was formed. This mixture was introduced into the condenser illustrated in the drawing at a temperature of 950–1100° C. and was mixed with approximately an equal volume of cool recycled gas (derived by chlorination of chromium ore and condensation of chromium and iron chlorides therefrom in a previous operation) at a temperature of 350–450° C., introduced through inlet 14, and chromic chloride was precipitated and removed. The uncondensed gases were then cooled, conveyed to a second condenser, and cooled to 40–50° C. and the iorn chloride was condensed and removed. Thereafter, a quantity of the cool uncondensed gases was mixed with a further portion of vaporized chromium chloride and iron chloride to assist in the condensation and precipitation of chromic chloride.

Example II

Using a condenser as shown in the drawing and introducing the nitrogen through inlet 14 cool gaseous nitrogen was mixed in a central portion of a condenser with a hot mixture containing substantially equal volumes of vaporized chromium and iron chlorides having a temperature of 1000° C. in the proportion of approximately two volumes of nitrogen for each volume of the gaseous chlorides and chromium chloride condensed and settled in the base of the condenser. The gas mixture on leaving the condenser was at a temperature of 350 to 450° C. Thereafter, residual chromic chloride was allowed to settle from the gases and the uncondensed vapors were cooled to 50° C. to precipitate the iron chloride.

While the present invention is directed to the recovery of chromium chloride from vapors containing such chloride, it may be applied to the recovery of other solid halides such as nickel, copper, aluminum or iron chloride from vapors produced by the chlorination of nickel, copper, tin, iron, titanium, and aluminum or other metal bearing material. This process is also effective in other fractional condensation processes such as the fractional condensation of aluminum or magnesium chloride from iron chloride or iron chloride from tin, titanium, or arsenic chlorides.

Although the present invention has been described with particular reference to specific details of certain embodiments thereof, it is not intended that such details shall be regarded as limitations upon the scope of the invention except insofar as included in the accompanying claims.

This application is a continuation-in-part of application Serial No. 319,273, filed February 16, 1940.

I claim:

1. A method which comprises chlorinating an iron chromium bearing material at a temperature sufficiently high to form and vaporize iron chloride and a chromium chloride, removing the vapors from the zone of chlorination, thereafter adding a substantial quantity of a gas which is substantially nonreactive to the chromium chloride to the vapors and passing the vapors upwardly while permitting the vapors to cool and condense a chromium chloride while maintaining the iron chloride largely in the vapor state and permitting the condensed chloride to fall out of the upwardly passing vapor stream.

2. A method which comprises chlorinating a chromium bearing material at a temperature sufficiently high to form and vaporize a chromium chloride, removing the vapors from the zone of chlorination, thereafter adding a substantial quantity of a gas which is substantially nonreactive to the chromium chloride, passing the vapors upwardly while permitting the vapors to cool and condense a chromium chloride and permitting the condensed chloride to fall out of the upwardly passing vapor stream.

3. A method which comprises forming a pervious bed of an iron chromium bearing ore and carbonaceous reducing agent within a reactor, introducing chlorine into said bed to cause chlorination of the chromium constituents and to form and vaporize a chloride of chromium, adding further portions of ore and reducing agent, regulating the rate of introduction of ore, chlorine, and carbonaceous reducing agent such that sufficient heat is evolved to maintain a temperature within the bed above 900° C. without externally heating the reactor, withdrawing the resulting vaporized chlorides from the zone of chlorination and thereafter adding to the vapors a substantial quantity of a gas which is substantially nonreactive to the chromium chloride, and condensing a chromic chloride.

4. The process of claim 3 in which at least one-half volume of the nonreactive gas is added per volume of vapor to be subjected to condensation and in which the chloride of chromium is condensed in a gaseous suspension.

IRVING E. MUSKAT.